US009581283B2

(12) United States Patent
Luis y Prado

(10) Patent No.: US 9,581,283 B2
(45) Date of Patent: Feb. 28, 2017

(54) LEVELING MACHINES ON SUPPORT SURFACES

(71) Applicant: Workshops for Warriors, San Diego, CA (US)

(72) Inventor: Hernán Luis y Prado, San Diego, CA (US)

(73) Assignee: Workshops for Warriors, San Diego, CA (US)

( * ) Notice: Subject to any disclaimer, the term of this patent is extended or adjusted under 35 U.S.C. 154(b) by 196 days.

(21) Appl. No.: 13/943,483

(22) Filed: Jul. 16, 2013

(65) Prior Publication Data

US 2014/0020234 A1 Jan. 23, 2014

Related U.S. Application Data

(60) Provisional application No. 61/672,665, filed on Jul. 17, 2012.

(51) Int. Cl.
*F16M 11/00* (2006.01)
*F16M 7/00* (2006.01)

(52) U.S. Cl.
CPC .............. *F16M 11/00* (2013.01); *F16M 7/00* (2013.01); *Y10T 29/49* (2015.01);
(Continued)

(58) Field of Classification Search
CPC .... F16M 11/00; F16M 7/00; Y10T 29/49899; Y10T 29/49897; Y10T 29/49895; Y10T 29/49
(Continued)

(56) References Cited

U.S. PATENT DOCUMENTS 1,741,487 A * 12/1929 Vance .................. 248/188.2
1,798,272 A *  3/1931 Phillips ................ 248/188.2
(Continued)

FOREIGN PATENT DOCUMENTS

SU         800475         1/1981

OTHER PUBLICATIONS

Authorized Officer L. Andreeva, Notification of Transmittal of International Search Report and Written Opinion of the International Searching Authority, International Application No. PCT/US2013/050730, mailed Oct. 18, 2013, 7 pages.

*Primary Examiner* — Christopher Besler
*Assistant Examiner* — Bayan Salone
(74) *Attorney, Agent, or Firm* — Fish & Richardson P.C.

(57) ABSTRACT

A method of leveling a machine on a support surface includes supporting the machine on the support surface, the machine including multiple load-bearing supports, and inserting a stack of support plates underneath a load-bearing support of the multiple load-bearing supports, the stack of support plates having an area and a strength that are sufficient to support the machine. The stack of support plates includes a first plate that includes multiple projections that extend outward from a bottom surface of the first plate and a second plate that includes multiple recesses that extend inward from a top surface of the second plate, the multiple recesses being sized to receive the multiple projections, respectively, and multiple grooves disposed along respective edges of the top surface. When the first plate is stacked adjacent the second plate, the first and second plates bear against each other to support a load of the machine.

21 Claims, 6 Drawing Sheets

(52) U.S. Cl.
CPC .... *Y10T 29/49895* (2015.01); *Y10T 29/49897* (2015.01); *Y10T 29/49899* (2015.01)

(58) Field of Classification Search
USPC ............ 29/464–466; 248/678, 346.01, 188.1
See application file for complete search history.

(56) References Cited

U.S. PATENT DOCUMENTS

| | | | | |
|---|---|---|---|---|
| 4,076,202 A | * | 2/1978 | McConnell | 248/188.2 |
| 4,232,068 A | * | 11/1980 | Hoh et al. | 428/43 |
| 4,647,228 A | * | 3/1987 | Jensen et al. | 384/420 |
| 4,669,696 A | * | 6/1987 | Petta | 248/550 |
| 4,784,364 A | * | 11/1988 | Chamberlain et al. | 248/673 |
| 4,809,421 A | * | 3/1989 | Justice | E06B 1/6069 248/188.2 |
| 5,054,250 A | * | 10/1991 | Foss | 52/126.1 |
| 5,640,813 A | * | 6/1997 | Glazik et al. | 52/126.1 |
| 5,713,550 A | * | 2/1998 | Schwarzli | 248/346.02 |
| 5,758,855 A | * | 6/1998 | Jordan et al. | 248/346.01 |
| 5,761,867 A | * | 6/1998 | Carling | 52/386 |
| 5,927,669 A | * | 7/1999 | Sassman | 248/346.01 |
| 6,152,409 A | * | 11/2000 | Schrepfer | F16M 7/00 248/146 |
| 6,560,934 B1 | * | 5/2003 | Workman | 52/126.1 |
| 6,572,071 B1 | * | 6/2003 | Tsai | 248/618 |
| 7,819,077 B2 | * | 10/2010 | Yapel | 118/100 |
| D680,564 S | * | 4/2013 | Snyder et al. | D15/141 |
| D681,083 S | * | 4/2013 | Snyder et al. | D15/141 |
| D681,084 S | * | 4/2013 | Snyder et al. | D15/141 |
| 8,739,941 B2 | * | 6/2014 | White et al. | 188/32 |
| 8,776,477 B2 | * | 7/2014 | Sprague | E04F 11/1851 52/126.3 |
| 2010/0087269 A1 | * | 4/2010 | Snyder | A63B 53/0487 473/329 |
| 2012/0083353 A1 | * | 4/2012 | Franklin | A63B 53/0487 473/251 |
| 2012/0090925 A1 | * | 4/2012 | White et al. | 188/32 |

* cited by examiner

LEVELING MACHINES ON SUPPORT SURFACES

CROSS REFERENCE TO RELATED APPLICATIONS

This application claims the benefit under 35 U.S.C. §119 (e)(1) of U.S. Provisional Patent Application No. 61/672,665, filed on Jul. 17, 2012, which is incorporated by reference herein.

TECHNICAL FIELD

This specification relates to leveling plates, including nesting leveling plates that may be used to level industrial equipment, such as calibration and testing equipment, military hardware, and precision electronics, and related systems and methods.

BACKGROUND

Certain industrial equipment, such as milling machines, need to maintain certain predetermined operating tolerances, oftentimes as small as fractions of millimeters. To achieve such precision, a milling machine should be positioned as level as possible on a machine shop floor, but typically, unevenness of machine shop floors make such leveling difficult. To compensate for uneven floors, metal shims referred to as "leveling plates" are selectively inserted as needed underneath one or more legs of a milling machine in order to level the machine.

SUMMARY

This specification describes nesting leveling plates, a method of manufacturing the nesting leveling plates, and a method of using the nesting leveling plates to, among other purposes, securely level industrial equipment.

In one aspect, a method of leveling a machine on a support surface includes supporting the machine on the support surface, wherein the machine includes multiple load-bearing supports, and inserting a stack of support plates underneath a load-bearing support of the multiple load-bearing supports, wherein the stack of support plates have an area and a strength that are sufficient to support the machine. The stack of support plates includes a first plate including multiple projections that extend outward from a bottom surface of the first plate, a second plate including multiple recesses that extend inward from a top surface of the second plate, and multiple grooves disposed along respective edges of the top surface. The multiple recesses are sized to receive the multiple projections, respectively. When the first plate is stacked adjacent the second plate, the first and second plates bear against each other to support a load of the machine, and the multiple projections extend within the multiple recesses, respectively, such that the first and second plates nest with each other and are substantially prevented from moving with respect to each other in two dimensions, and the multiple grooves form respective cavities between the bottom surface of the first plate and the top surface of the second plate.

In another aspect, a stack of support plates includes a first plate including multiple projections that extend outward from a bottom surface of the first plate, a second plate including multiple recesses that extend inward from a top surface of the second plate, and multiple grooves disposed along respective edges of the top surface. The multiple recesses are sized to receive the multiple projections, respectively. When the first plate is stacked adjacent the second plate, the first and second plates bear against each other to support a load of the machine, and the multiple projections extend within the multiple recesses, respectively, such that the first and second plates nest with each other and are substantially prevented from moving with respect to each other in two dimensions, and the multiple grooves form respective cavities between the bottom surface of the first plate and the top surface of the second plate.

In another aspect, a method of manufacturing a support plate includes forming a core of the support plate, wherein the core has a first surface and a second surface opposite the first surface, forming multiple projections that extend outward from the first surface, forming multiple recesses that extend inward from the second surface, wherein the multiple recesses are sized to receive respective projections of another support plate, and the respective projections of the other support plate are configured substantially the same as the multiple projections of the support plate, and forming multiple grooves along respective edges of the second surface. When the support plate is stacked adjacent the other support plate, the other support plate including respective projections configured substantially the same as the multiple projections of the support plate, the respective projections of the other support plate extend within the multiple recesses of the support plate, such that the support plate and the other support plate nest with each other and are substantially prevented from moving with respect to each other in two dimensions, and the multiple grooves form respective cavities between the support plate and the other support plate.

The nesting leveling plates, the method of manufacturing the nesting leveling plates, and the method of using the nesting leveling plates may include one or more of the following features.

In some examples, the method of leveling the machine on the support surface further includes adjusting a thickness of the stack of support plates.

In some examples, the method of leveling the machine on the support surface further includes adding one or more additional support plates to the stack of support plates.

In some examples, the method of leveling the machine on the support surface further includes inserting another stack of support plates underneath another load-bearing support of the machine.

In some examples, when the stack of support plates is disposed underneath the load-bearing support, the first plate is in direct contact with the load-bearing support.

In some examples, the first plate includes one or more recesses that extend from a top surface of the first plate, the one or more recesses sized to engage a leveling component of the machine.

In some examples, the first plate includes a textured surface configured to reduce movement between the first plate and an object that is in direct contact with the first plate.

In some examples, the textured top surface includes a scoring.

In some examples, the textured top surface includes patterns that are oriented about 90 degrees with respect to one another.

In some examples, the second plate includes a non-marring surface.

In some examples, the stack of plates further includes one or more of a third plate and a fourth plate.

In some examples, the cavities are sized to receive a separation tool.

In some examples, the stack of support plates is made of one or materials including steel, aluminum, and titanium.

In some examples, the stack of support plates includes a precision ground material.

In some examples, either of the first plate and the second plate is configured to support a load of up to about 10,000 lb about 50,000 lb.

In some examples, the first and second plates have thicknesses between about ¼ inch and about 1.0 inch.

In some examples, the multiple projections and the multiple recesses have generally circular cross-sectional areas.

In some examples, the multiple recesses each have a diameter of about ⅞ inch and a depth of about 1/16 inch, and the multiple projections each have a diameter of about ¾ inch.

In some examples, the first and second plates have generally square cross-sectional areas.

In some examples, the first and second plates have lengths of about 3.75 inches.

In some examples, one of the multiple projections is located at a center of the first plate, and one of the multiple recesses is located at a center of the second plate.

In some examples, one or more of the multiple projections are located near respective corners of the first plate, and one or more of the multiple recesses are located near respective corners of the second plate.

In some examples, the one or more of the multiple projections are located about ⅝ inch from respective edges of the first plate, and the one or more of the multiple recesses are located about ⅝ inch from respective edges of the second plate.

In some examples, the core of the support plate, the multiple projections, the multiple recesses, and the multiple grooves are formed by casting a block of material.

In some examples, one or more of the multiple projections, the multiple recesses, and the multiple grooves are formed by a subtraction operation.

In some examples, subtraction operation includes milling.

In some examples, a texture is formed on at least one of the first and second surfaces of the core.

In some examples, the texture is formed by face milling the at least one of the first and second surfaces of the core.

In some examples, the texture includes patterns that are oriented about 90 degrees with respect to one another.

In some examples, the method of manufacturing the support plate further includes finishing the support plate.

In some examples, finishing the support plate includes forming one or more beveled edges on the support plate.

The leveling plate includes a substantially planar body having a top surface and a bottom surface, one or more first nesting features disposed on the top surface, and one or more second nesting features disposed on the bottom surface, wherein the first and second nesting features are configured to be complementary such that when the leveling plate is stacked adjacent to another leveling plate the first and second nesting features mate in a manner that substantially prevents horizontal relative movement between the leveling plate and the other leveling plate.

The leveling plate may be composed of steel, aluminum, titanium, or other non-compressible material. The one or more first nesting features may include recesses and the one or more second nesting features may include posts, either or both of which may be circular in shape, or may take other, non-circular shapes. The leveling plate may further include one or more release grooves disposed along at least one edge of the leveling plate and/or a texture on at least one of the top and bottom surfaces, the texture configured to grip an object to be leveled. The first nesting features may include multiple recesses disposed near one or more corners of the leveling plate and the second nesting features may include multiple posts disposed near one or more corners of the leveling plate. The one or more first and/or second nesting features may include at least one feature disposed at a center of the leveling plate. The leveling plate may be rectangular in shape (e.g., square) or may be other than rectangular in shape (e.g., circular, triangular or the like). The method of manufacturing the leveling plate may involve obtaining a block of material having a top surface and a bottom surface, forming one or more first nesting features (e.g., recesses) on the top surface of the block, and forming one or more second nesting features (e.g., posts) on the bottom surface of the block. The first and second nesting features may be formed to be complementary such that when the leveling plate is stacked adjacent to another leveling plate the first and second nesting features mate in a manner that substantially prevents horizontal relative movement between the leveling plate and the other leveling plate. The method of manufacturing may involve milling, casting and/or one or more other suitable manufacturing techniques. Particular implementations of the subject matter described in this specification may be configured to realize various potential advantages. For example, in leveling an item such as a piece of industrial equipment, two or more leveling plates (e.g., nesting support plates) may be stacked in a highly secure manner such that, despite mechanical vibrations, the leveling plates will not separate from one another, preventing the collapse of a large and heavy piece of machinery. This not only creates a safer environment, but saves money in scrapped parts due to an improperly leveled machine that has been knocked out of level due to vibrating off of its shims. In addition, due to the scoring on the face of a leveling plate contacting the item being leveled, the leveling plate-item interface will be more secure and less susceptible to slippage or other relative movement, which typically results over time during industrial equipment operation. This movement can lead to loss of tolerancing, scrapped parts, and wasted man-hours.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 2A:
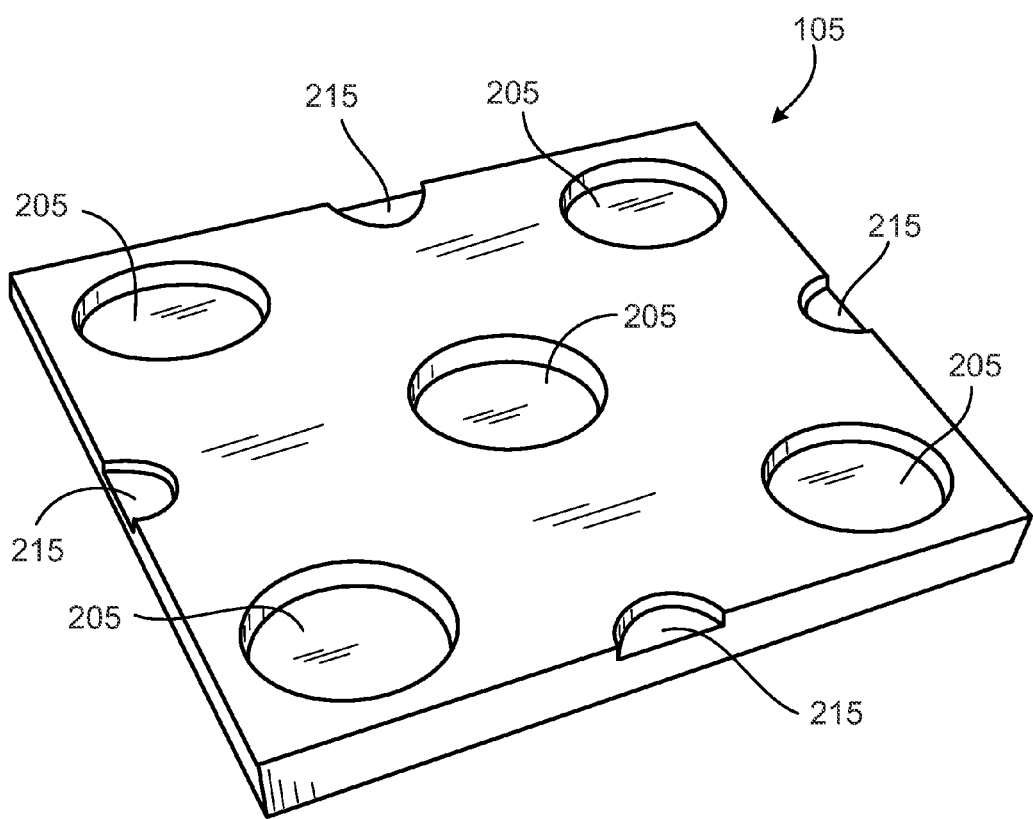
FIG. 2A is a perspective view of a top surface of a leveling plate of the stack of leveling plates of FIG. 1.

The present inventor recognized that two or more stacked conventional leveling plates, which typically are flat, relatively smooth slabs of metal, tend to move relative to each other over time as a natural result of the mechanical vibration of the industrial equipment under which they are disposed. That relative movement could pose a safety hazard if, for example, one of the conventional leveling plates slipped from its stack and caused the industrial equipment that it was supporting to tip, fall, malfunction or break. In view of that recognition, the present inventor further recognized that leveling plates incorporating a nesting feature—that is, one or more features that prevent stacked leveling plates from moving any substantial amount relative to each other in one or more dimensions—would help to prevent the safety hazards posed by slipping conventional leveling plates. Furthermore, such nesting leveling plates may additionally incorporate a locking feature which secures the leveling screws (also referred to as "jacking" screws) inherent to most machines into one of the machined recesses (e.g., a recess 205 as illustrated in FIG. 2A, and as will be discussed in more detail below). This ensures that the machine will not move off of the leveling plate.

Figure 1:
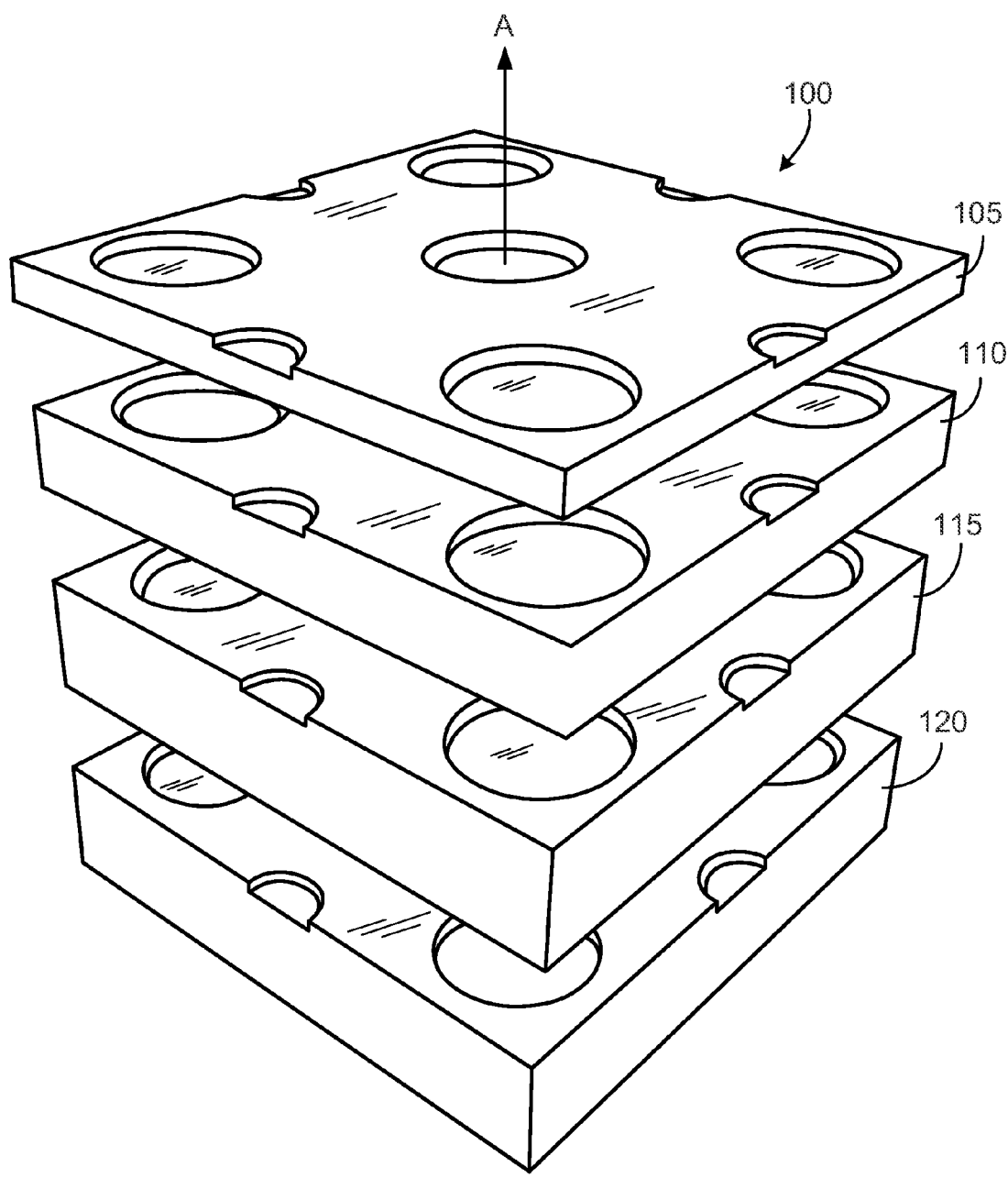
FIG. 1 is an exploded perspective view of a stack of leveling plates.

FIG. 1 is an exploded perspective view of a stack 100 of leveling plates (e.g., support plates) 105, 110, 115, and 120. As shown, the leveling plates 105-120 are stackable about a vertical axis A and can maintain a horizontal position relative to each other, as a result of features (e.g., described in detail with respect to FIGS. 2A and 2B) that cause each leveling plate to nest with one or more adjacent leveling plates. In this example, the stack 100 includes four leveling plates including a one-inch-thick base plate 120 (which has nesting features on its top surface but not on its bottom surface to better maintain contact with the ground), a one-inch-thick intermediate plate 115, a half-inch-thick intermediate plate 110 and a quarter-inch-thick top plate 105. The leveling plates 105-110 may be stacked in a different order than that shown in FIG. 1, and fewer than all four leveling plates 105-110 may be stacked such that an overall thickness of the stack 100 may be adjusted to accommodate different leveling heights of industrial equipment. The plates 105-120 have a generally square-shaped cross-sectional area with a length of about 3.75 inches. The leveling plates 105, 110, and 115 each has the nesting features shown in FIGS. 2A and 2B on both its top and bottom surfaces, respectively. Although the leveling plates 105-120 are shown having specific thicknesses and sizes in the example of FIG. 1, any suitable sizes and/or thicknesses can be manufactured and used depending on the specific end application. In addition, the leveling plates 105-120 could have cross-sectional shapes other than squares or rectangles (e.g., circles, ovals, triangles or the like) if appropriate to the particular end application. In terms of material composition, the leveling plates 105-120 may be made of one or more of any suitably hard, resilient, and/or non-compressible materials (e.g., steel, aluminum, titanium) that are appropriate to the end application. Such suitable materials provide the leveling plates 105-120 with a strength that allows the stack 100 to support particularly heavy pieces of equipment (e.g., a shear, a lathe, a mill, a press brake, or a water jet cutter) that may not be adequately supported by conventional shims. For example, each of the leveling plates 105-120 may support loads of up to about 10,000 lb. to about 50,000 lb. In some examples, the leveling plates 105-120 may be made of one or more precision ground materials, such that the stack 100 may provide leveling within 0.125 inch of the desired leveling height. In some cases, one or more leveling plates 105-120 of the stack 100 may be welded to a floor surface or to a machine.

Figure 2B:
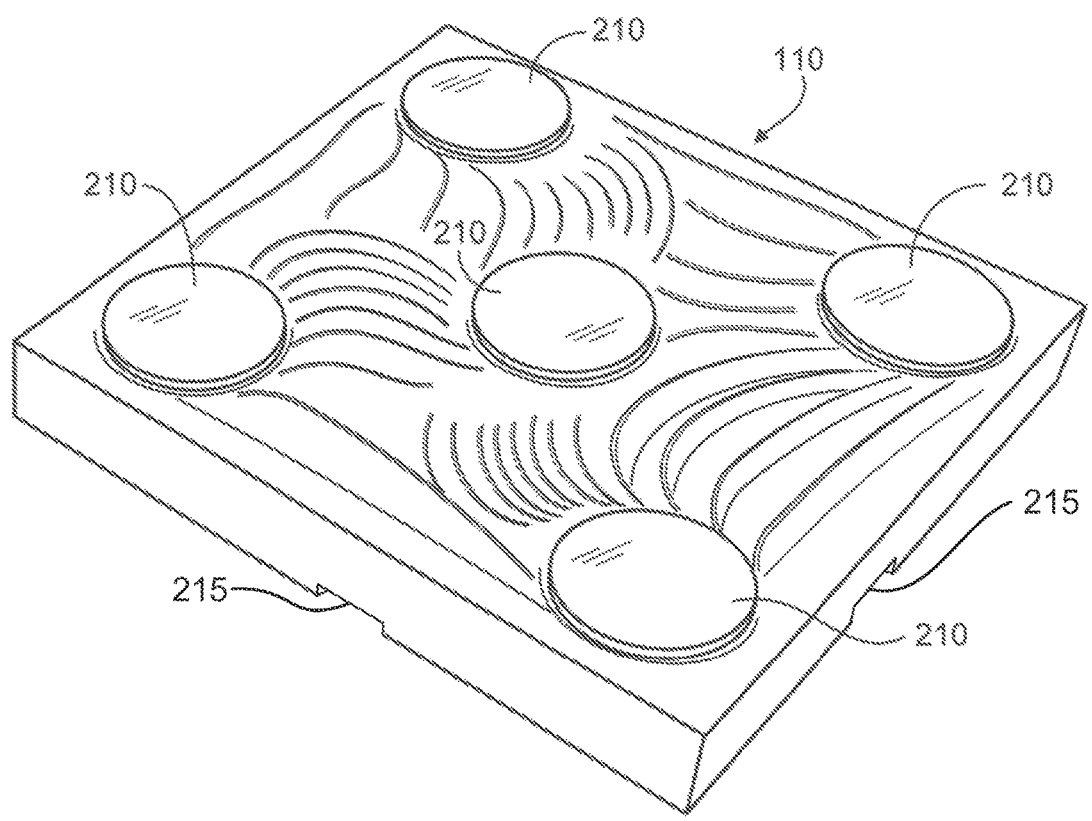
FIG. 2B is a perspective view of a bottom surface of a leveling plate of the stack of leveling plates of FIG. 1.

FIGS. 2A and 2B are perspective views of a top surface of the top plate 105 and a bottom surface of the intermediate plate 110, respectively. As shown, each of the plates 105, 110 has features that, when the plates 105, 110 are stacked, mate with complementary features on adjacent plates and effectively prevent any substantial amount of relative horizontal movement between the plates 105, 110. More specifically, in FIG. 2A, the top surface of the plate 105 has five circular recesses 205 (about 1/16 inch deep and having 7/8 inch diameter) distributed on the surface in a pattern such that one of the recesses 205 is centered in the middle of the plate 105 and the other four recesses 205 occupy respective corners of the plate 105. The four recesses 205 located near the corners of the plate 105 are centered at about 5/8 inch from surrounding edges of the plate 105. The center recess 205 of the top plate 105 accommodates the leveling or "jacking" screw included with most machines and heavy equipment and prevents the equipment from sliding off of the plate 105.

FIG. 2B shows the complementary features—namely, posts 210—on the bottom surface of plate 110. The posts 210 are sized and arranged such that, when appropriately stacked with any of the plates 105, 115, or 120, the posts 210 mate with recesses 205 and cause the two plates to be nested such that any substantial amount of horizontal movement between the two plates is effectively prevented. In the example of FIG. 2B, the posts 210 have a generally circular cross-sectional shape that has a diameter (e.g., about 3/4 inch) slightly less than that of the recesses 205 and a length that is complimentary with (e.g., slightly less than) the depth of the recesses 205, such that the posts 210 can nest within the recesses 205 of an adjacent plate. Thus, the positions, heights, and diameters of the posts 210 are appropriately chosen such that the posts 210 nicely mate with the recesses 205 when the plate 110 is stacked with any of the plates 105, 110, or 120. In this manner, the intermediate plate 110 and an adjacent plate with which the intermediate plate 110 is nested may be substantially prevented from moving with respect to each other in two dimensions (e.g., in a horizontal plane that is parallel to the top and bottom surfaces of the plates). Accordingly, one post 210 is positioned substantially at a center of the intermediate plate 110, and the other four posts 210 are positioned near respective corners of the plate 110. In some examples, the four posts 210 located near the corners of the plate 110 are centered at approximately 5/8 inch from surrounding edges of the plate 110. Alignment and nesting of the posts 210 with respective recesses 205 provides an adequate distribution of a load supported by the stack 100 across a horizontal plane of the stack 100.

Each of the plates 105, 115 (as shown in FIG. 1) includes a bottom surface that has substantially the same form as the bottom surface of the intermediate plate 110. Accordingly, each of the plates 105, 115 include the five posts 210 that are located in substantially the same positions as are those located with respect to the intermediate plate 110. The base plate 120 includes a bottom surface (not shown) that is substantially flat (i.e., a bottom surface that does not include the posts 210).

Referring to FIG. 2A, the top surface of plate 105 also includes four grooves 215 (e.g., release grooves) that are each located along a respective edge of the top plate 105. The grooves 215 help facilitate separation of the top plate from a plate (e.g., the intermediate plate 110 or 115) that may, for example, be stacked atop the top plate 105 and therefore be stuck to the top plate 105 after being stacked under pressure for a certain duration of time. For example, an appropriate tool (e.g., a screw driver, a chisel, or a pry bar) may be inserted into a groove 215 between the top plate 105 and an adjacent plate that is stacked atop the top plate 105 to separate (e.g., pry apart) the top plate 105 and the adjacent plate. In the example of FIG. 2A, the grooves 215 have a generally semi-circular shape with a diameter of about ½ inch and a depth of about 1/10 inch. However, the grooves 215 may generally have a different shape and size. In some examples, the top plate 105 may include more than four or less than four grooves 215.

Additionally, the number, type, size, position, shape, and nature of the nesting features 205 and 210 need not be those shown in FIGS. 2A and 2B, but rather can be varied to take essentially any appropriate form depending on the desired application and/or manufacturing specifications. For example, a shape other than circular could be used for posts 210 and recesses 205. Furthermore, the number of nesting features on each surface could be more or less than the five shown in FIGS. 2A and 2B, and positions of those features can be varied as desired.

Each of the plates 110-120 (as shown in FIG. 1) includes a top surface that has substantially the same form as the top surface of the top plate 105. Accordingly, each of the plates 110-120 include the five recesses 205 and the four grooves 215, which recesses 205 and grooves 215 are located in substantially the same positions as are those located with respect to the top plate 105.

Figure 3:
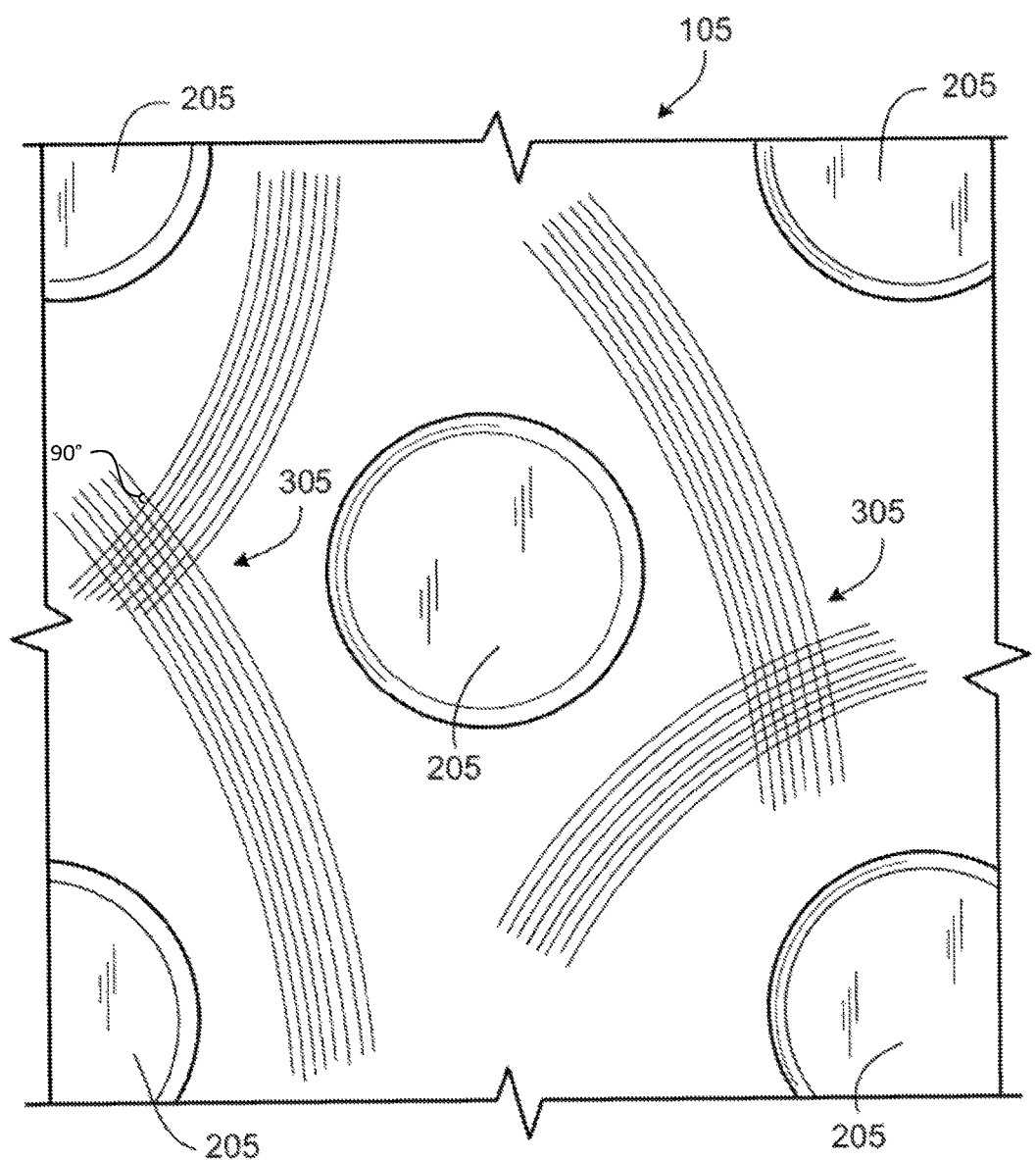
FIG. 3 is a top view of a portion of a surface of a leveling plate of the stack of leveling plates of FIG. 1.

FIG. 3 is a top view of a portion of the top surface of the top plate 105. As shown, the surface is formed to have scoring or other texture 305 such that the top plate 105 better grips the surface of the item to be leveled, thereby helping to reduce slippage or other relative horizontal movement between the stack 100 and the item being leveled. In this example, the texture 305 can be achieved by milling patterns in the surface of a plate. The patterns may have a curved shape. In some examples, adjacent patterns may be oriented at ninety degree angles with respect to each other to enhance surface adhesion between a piece of equipment and reduce equipment slippage of the piece of equipment along the stack 100 in the x and y directions (as indicated by the coordinate system shown in FIG. 3). The bottom surface of the top plate 105, the top and bottom surfaces of the intermediate plates 110, 115, and the top surface of the base plate 120 similarly are formed to have the texture 305. The bottom surface of base plate 220 (shown in FIG. 1) typically does not have any scoring or texture, but rather is smooth on its bottom surface. Such a sufficiently smooth bottom surface of the base plate 220 provides a non-marring surface that substantially prevents floor marring or other damage to a manufacturing floor and helps ensure that the weight of the machine is spread out evenly across the manufacturing floor.

Figure 4:
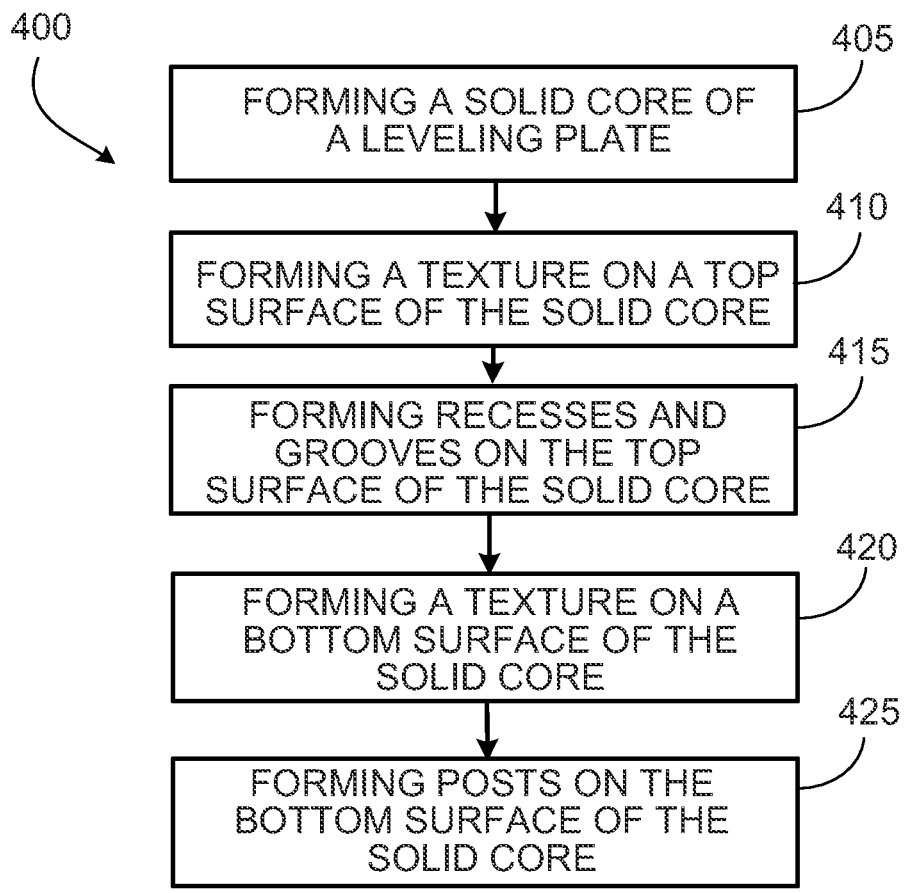
FIG. 4 is a flowchart of an example process for manufacturing a leveling plate.

FIG. 4 is a flowchart of an example process 400 for manufacturing a leveling plate (e.g., any of the plates 105-120 of the stack 100). One or more of the process steps depicted in FIG. 4 may be performed serially or in parallel (i.e., overlap in time with each other, at least in part), and/or may be performed in a different order than that shown in FIG. 4. In some examples, the leveling plate may be manufactured by milling a block of material. In some examples, the leveling plate may be manufactured using a different manufacturing technique (e.g., by casting a plate in metal using a mold or other form).

In the example manufacturing process 400 shown in FIG. 4, a solid core of the leveling plate is formed (405). For example, the solid core may be formed by cutting a block of material to a rough dimension of the overall size of the leveling plate. The block of material may include one or more of any suitably hard, resilient, and/or non-compressible materials (e.g., steel, aluminum, and titanium). In some examples, the block of material may be a precision ground material. Next, at 410, a texture (e.g., the texture 305 of the leveling plates 105-120) is formed on a top surface of the leveling plate. For example, the texture 305 may be formed by face milling the top surface in the X direction and then face milling the top surface in the Y direction (or vice versa), thus providing the texture 305 with patterns that are oriented about 90 degrees with respect to one another. Next, at 415, the recesses (e.g., the recesses 205 of the leveling plates 105-120) and release grooves (e.g., the grooves 215 of the leveling plates 105-120) are formed in the top surface of the leveling plate by a subtraction operation (e.g., milling). Then at 420, after the block has been turned over and secured, an additional texture (e.g., the texture 305 of the leveling plates 105-120) is formed on the bottom surface of the leveling plate by face milling the bottom surface in the X direction and then the Y direction (or vice versa). At 425, the posts (e.g., the posts 210 of the leveling plates 105-115) are formed in the bottom surface of the leveling plate via an appropriate manufacturing technique (e.g., milling or stamping). In some examples, finishing processes (e.g., beveling edges of the leveling plate) may be performed on the leveling plate.

Figure 5:
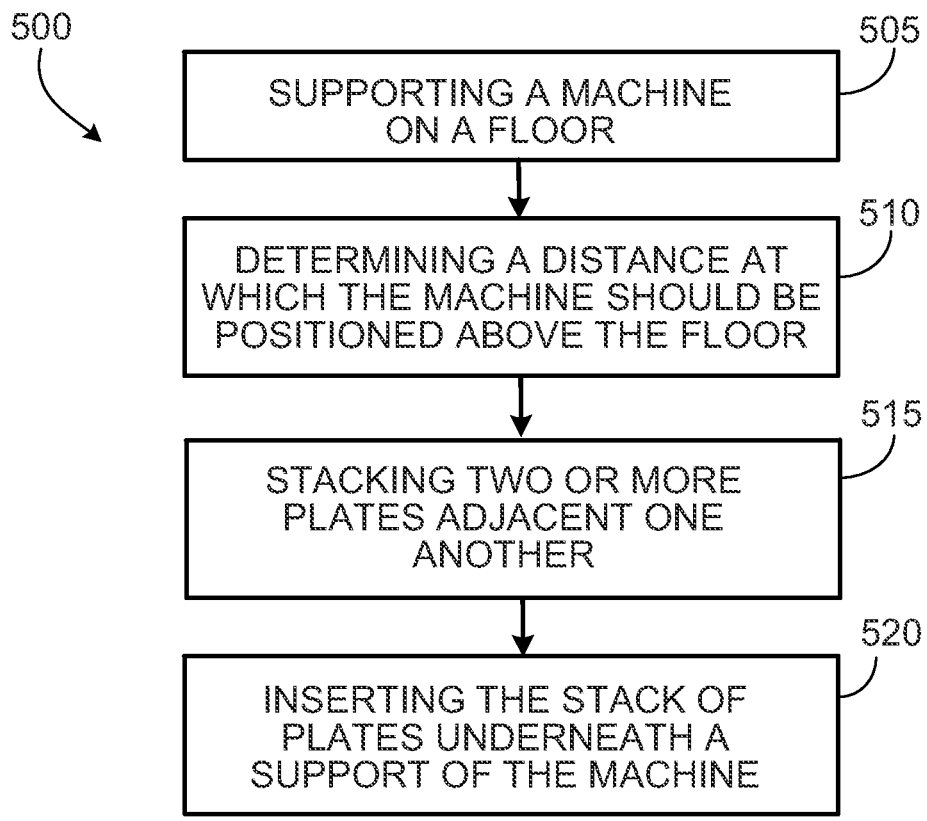
FIG. 5 is a flowchart of an example process for leveling a machine on a support surface.

FIG. 5 is a flowchart of an example process 500 for leveling a machine on a support surface (e.g., a machine shop floor). In some implementations, the machine may include load-bearing supports (e.g., support legs) that extend from a bottom side of the machine (e.g., from the bottom side of the machine near respective corners of the machine). The machine may be supported on the machine shop floor (505). In some implementations, a distance may be determined at which the machine should be positioned above the support surface (510), in order to level the machine for appropriate operational performance. According to the distance, two or more plates of a stack of support plates (e.g., the plates 105-120 of the stack 100) are selected and stacked adjacent one another (515). The stack of plates may have a surface area and a strength that are sufficient to support the weight of the machine. The stack of plates is inserted underneath one of the load-bearing supports of the machine (520), such that the respective region of the machine is lifted above its initial height, thereby leveling the machine for appropriate operational performance. In some examples, the stack of plates may be positioned such that a leveling component (e.g., a jacking screw) of the machine engages a nesting feature (e.g., the center recess 205 of the plates 105-120) disposed on the top surface of the top plate of the stack of support plates. In some implementations, one or more additional stacks of support plates may be inserted underneath one or more other respective load-bearing supports of the machine in order to further adjust the height of the machine for appropriate operational performance.

Particular embodiments of the subject matter have been described. Other embodiments are within the scope of the following claims. For example, the actions recited in certain claims can be performed in a different order and still achieve desirable results. As one example, the processes depicted in the accompanying figures do not necessarily require the particular order shown, or sequential order, to achieve desirable results.

What is claimed is:

1. A method of leveling a machine on a support surface, the method comprising:
 supporting the machine on the support surface, the machine comprising a plurality of load-bearing supports; and inserting a stack of support plates underneath a load-bearing support of the plurality of load-bearing supports, the stack of support plates having an area and a strength that are sufficient to support the machine, the stack of support plates comprising:
- a first plate comprising a plurality of projections that extend outward from a bottom surface of the first plate, wherein the first plate comprises a textured surface configured to reduce movement between the first plate and an object that is in direct contact with the first plate, wherein the textured surface comprises a plurality of patterns having a curved shape, wherein adjacent patterns are oriented at substantially ninety degree angles with respect to each other, and
- a second plate comprising a plurality of recesses that extend inward from a top surface of the second plate, the plurality of recesses being sized to receive the plurality of projections, respectively, and a plurality of grooves disposed along respective edges of the top surface, wherein either of the first plate and the second plate is configured to support a load of up to about 10,000 lb to about 50,000 lb,
- wherein when the first plate is stacked adjacent the second plate, the first and second plates bear against each other to support a load of the machine, the plurality of projections extend within the plurality of recesses, respectively, such that the first and second plates nest with each other and are substantially prevented from moving with respect to each other in two dimensions, and the plurality of grooves form respective cavities between the bottom surface of the first plate and the top surface of the second plate.

2. The method of claim 1, further comprising adjusting a thickness of the stack of support plates.

3. The method of claim 2, comprising adding one or more additional support plates to the stack of support plates.

4. The method of claim 1, further comprising inserting another stack of support plates underneath another load-bearing support of the machine.

5. The method of claim 1, wherein when the stack of support plates is disposed underneath the load-bearing support, the first plate is in direct contact with the load-bearing support.

6. The method of claim 1, wherein the first plate comprises one or more recesses that extend from a top surface of the first plate, the one or more recesses sized to engage a leveling component of the machine.

7. The method of claim 1, wherein the second plate comprises a non-marring bottom surface.

8. The method of claim 1, wherein the stack of support plates comprises one or more of a third plate and a fourth plate.

9. The method of claim 1, wherein the stack of support plates comprises one or materials including steel, aluminum, and titanium.

10. The method of claim 1, wherein the stack of support plates comprises a precision ground material.

11. The method of claim 1, wherein the first and second plates have thicknesses between about 0.25 inch and about 1.0 inch.

12. The method of claim 1, wherein one of the plurality of projections is located at a center of the first plate, and one of the plurality of recesses is located at a center of the second plate.

13. The method of claim 1, wherein one or more of the plurality of projections are located near respective corners of the first plate, and one or more of the plurality of recesses are located near respective corners of the second plate.

14. A stack of support plates for leveling a machine on a support surface, the stack of support plates comprising:
- a first plate comprising a plurality of projections that extend outward from a bottom surface of the first plate, wherein the first plate comprises a textured surface configured to reduce movement between the first plate and an object that is in direct contact with the first plate, wherein the textured surface comprises a plurality of patterns having a curved shape, wherein adjacent patterns are oriented at substantially ninety degree angles with respect to each other, and
- a second plate comprising a plurality of recesses that extend inward from a top surface of the second plate, the plurality of recesses being sized to receive the plurality of projections, respectively, and a plurality of grooves disposed along respective edges of the top surface, wherein either of the first plate and the second plate is configured to support a load of up to about 10,000 lb to about 50,000 lb,
- wherein when the first plate is stacked adjacent the second plate, the first and second plates bear against each other to support a load of the machine, the plurality of projections extend within the plurality of recesses, respectively, such that the first and second plates nest with each other and are substantially prevented from moving with respect to each other in two dimensions, and the plurality of grooves form respective cavities between the bottom surface of the first plate and the top surface of the second plate.

15. The stack of support plates of claim 14, wherein the first plate comprises:
- one or more recesses that extend from a top surface of the first plate, the one or more recesses sized to engage a leveling component of the machine; and
- a locking feature configured to secure the leveling component into at least one of the one or more recesses.

16. The stack of support plates of claim 14, further comprising one or more of a third plate and a fourth plate.

17. The stack of support plates of claim 14, wherein one of the plurality of projections is located at a center of the first plate, and one of the plurality of recesses is located at a center of the second plate.

18. The stack of support plates of claim 14, wherein one or more of the plurality of projections are located near respective corners of the first plate, and one or more of the plurality of recesses are located near respective corners of the second plate.

19. The method of claim 6, wherein the first plate comprises a locking feature configured to secure the leveling component into at least one of the one or more recesses, the locking feature.

20. The method of claim 1, wherein the plurality of patterns comprise a first subset of patterns comprising one or more of the plurality of patterns and a second subset of patterns comprising one or more of the plurality of patterns, wherein at least a portion of the first subset of patterns intersects at least a portion of the second subset of patterns.

21. The method of claim 1, wherein the plurality of grooves disposed along the top surface of the second plate have a curved shape wherein adjacent grooves are oriented at substantially ninety degree angles with respect to each other, wherein the plurality of grooves disposed along the top surface of the second plate comprise a first subset of grooves comprising one or more of the plurality of grooves and a second subset of grooves comprising one or more of the plurality of grooves, wherein at least a portion of the first subset of grooves intersects at least a portion of the second subset of grooves.

* * * * *